US010504466B2

(12) United States Patent
Peng et al.

(10) Patent No.: US 10,504,466 B2
(45) Date of Patent: Dec. 10, 2019

(54) METHOD, DEVICE AND NON-TRANSITORY COMPUTER-READABLE MEDIUM FOR CONTROL OF REFRESH FREQUENCY OF DISPLAY UNIT

(71) Applicant: GUANGDONG OPPO MOBILE TELECOMMUNICATIONS CORP., LTD., Dongguan, Guangdong (CN)

(72) Inventors: Deliang Peng, Guangdong (CN); Yongpeng Yi, Guangdong (CN); Shengjun Gou, Guangdong (CN); Xiaori Yuan, Guangdong (CN); Gaoting Gan, Guangdong (CN); Zhiyong Zheng, Guangdong (CN); Hai Yang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 38 days.

(21) Appl. No.: 15/860,992

(22) Filed: Jan. 3, 2018

(65) Prior Publication Data
US 2018/0261174 A1 Sep. 13, 2018

(30) Foreign Application Priority Data
Mar. 10, 2017 (CN) .......................... 2017 1 0142965

(51) Int. Cl.
  *G09G 3/36* (2006.01)
  *G09G 5/00* (2006.01)
  (Continued)

(52) U.S. Cl.
  CPC ........... *G09G 3/3618* (2013.01); *G09G 5/001* (2013.01); *G09G 5/003* (2013.01); *G09G 5/18* (2013.01);
  (Continued)

(58) Field of Classification Search
  None
  See application file for complete search history.

(56) References Cited

U.S. PATENT DOCUMENTS

| 8,120,621 | B1 | 2/2012 | Ogrinc et al. |
| 8,542,221 | B1 | 9/2013 | Wyatt et al. |

(Continued)

FOREIGN PATENT DOCUMENTS

| CN | 104091579 A | 10/2014 |
| CN | 104808984 A | 7/2015 |

(Continued)

OTHER PUBLICATIONS

Search Report in respect of counterpart Application 17200276.8-1209.

(Continued)

*Primary Examiner* — Robert J Craddock
(74) *Attorney, Agent, or Firm* — Ladas & Parry LLP

(57) ABSTRACT

A method, device and non-transitory computer-readable medium for control of a refresh frequency of a display unit are disclosed. The display unit is in communication with a processor and configured to display image frames processed by the processor on a screen of the display unit. The method includes: acquiring a real-time frame composition frequency corresponding to an amount of time required for the processor to complete composition of an image frame to be displayed; determining a refresh frequency of the display unit based on the real-time frame composition frequency, when the real-time-frame composition frequency satisfies a preset condition; and refreshing the screen of the display unit at the determined refresh frequency.

17 Claims, 6 Drawing Sheets

(51) Int. Cl.
  *G09G 5/18* (2006.01)
  *G09G 5/36* (2006.01)
  *G06F 3/14* (2006.01)
  *G09G 5/399* (2006.01)

(52) U.S. Cl.
  CPC .............. *G09G 5/36* (2013.01); *G09G 5/363* (2013.01); *G06F 3/14* (2013.01); *G09G 5/399* (2013.01); *G09G 2320/08* (2013.01); *G09G 2320/103* (2013.01); *G09G 2330/021* (2013.01); *G09G 2340/0435* (2013.01); *G09G 2350/00* (2013.01); *G09G 2360/08* (2013.01)

(56) References Cited

U.S. PATENT DOCUMENTS

2013/0141642 A1  6/2013  Wu et al.
2016/0195988 A1  7/2016  Fu et al.
2016/0247484 A1  8/2016  Chen
2017/0053620 A1  2/2017  Law et al.

FOREIGN PATENT DOCUMENTS

| | | |
|---|---|---|
| CN | 105094272 A | 11/2015 |
| CN | 105141943 A | 12/2015 |
| CN | 105869560 A | 8/2016 |
| CN | 106412338 A | 2/2017 |
| CN | 106657681 A | 5/2017 |
| WO | 2015067143 A1 | 5/2015 |
| WO | 2015172725 A1 | 11/2015 |

OTHER PUBLICATIONS

Abstract of CN105141943 A.
International Search Report (ISR) and Written Opinion (WO) dated Jan. 17, 2018 for International Application No. PCT/JP2017/106849.

METHOD, DEVICE AND NON-TRANSITORY COMPUTER-READABLE MEDIUM FOR CONTROL OF REFRESH FREQUENCY OF DISPLAY UNIT

CROSS REFERENCE TO RELATED APPLICATIONS

This application claims priority to Chinese patent application No. 201710142965.8 titled "METHOD AND DEVICE FOR CONTROL OF REFRESH FREQUENCY FOR MOBILE TERMINAL, AND MOBILE TERMINAL", and filed on Mar. 10, 2017, the disclosures for which are hereby incorporated herein in their entireties by reference.

TECHNICAL FIELD

The present disclosure relates generally to a display technique for computing devices, and more particularly, to a method, device and non-transitory computer-readable medium for control of a refresh frequency of a display unit.

BACKGROUND

With the rapid development of information technology, the use of computing devices, in particular, mobile computing devices, such as notebook computer, mobile phone and tablet device, becomes more and more popular, and the requirement to display quality of a display unit in the computing device becomes more and more critical. When the computing device displays images on the display unit, the refresh frequency of the display unit plays a key role in the stability of the images. Especially for the display of dynamic sequential images, the lower the refresh frequency is, the more serious the image blinking and dithering will be, and the more easily eye strain will grow. On the contrary, the higher the refresh frequency is, the more computing resources are occupied, and the more energy is consumed. A higher refresh frequency raises a higher requirement on the performance of the computing device. The maximum refresh frequency available for the display unit is generally limited by hardware and software of computing device, for example, bandwidth, and resolution of the image to be displayed.

For a mobile computing device, for example, a mobile phone, processes of controlling image display on the display unit may generally include image rendering, image composing and image displaying. For example, when a desktop program runs in the mobile phone to display a desktop interface on a screen of a display unit of the mobile phone and a video player runs in the mobile phone to display a video on the screen, a processor contained in the mobile phone may render images of the respective programs, compose the rendered images into a display frame, and output the display frame to the display unit to display it on the screen. The refresh frequency of the display unit is not well controlled in the related art.

SUMMARY

The present disclosure provides a method, device and non-transitory computer-readable medium for control of a refresh frequency of a display unit, to control the refresh frequency of the display unit dynamically and reasonably.

According to one aspect of the disclosure, a method for control of a refresh frequency of a display unit is provided, the display unit being in communication with a processor and configured to display image frames processed by the processor on a screen of the display unit. The method can include: acquiring a real-time frame composition frequency corresponding to an amount of time required for the processor to complete composition of an image frame to be displayed; determining a refresh frequency of the display unit based on the real-time frame composition frequency, when the real-time frame composition frequency satisfies a preset condition; and refreshing the screen of the display unit at the determined refresh frequency.

According to an additional aspect of the disclosure, a device is provided. The device can include: a processor, a memory, and one or more programs. The one or more programs are stored in the memory and configured to be executed by the processor. The one or more programs can include: a real-time frame composition frequency acquiring module, configured to acquire a real-time frame composition frequency corresponding to an amount of time required for the processor to complete composition of an image frame to be displayed; an refresh frequency determining module, configured to determine a refresh frequency of the display unit based on the real-time frame composition frequency, when the real-time frame composition frequency satisfies a preset condition; and a display unit refreshing module, configured to refresh a screen of the display unit at the determined refresh frequency.

According to a further aspect of the disclosure, a non-transitory computer-readable storage medium for storing computer executable instructions is provided. The computer executable instructions are used to control a processor to execute a method for control of a refresh frequency of a display unit, the display unit being in communication with the processor and configured to display image frames processed by the processor on a screen of the display unit, the method including: acquiring a real-time frame composition frequency corresponding to an amount of time required for the processor to complete composition of an image frame to be displayed; determining a refresh frequency of the display unit based on the real-time frame composition frequency, when the real-time frame composition frequency satisfies a preset condition; and refreshing a screen of the display unit at the determined refresh frequency.

BRIEF DESCRIPTION OF THE DRAWINGS

In order to illustrate the technical solutions of the present disclosure more clearly, a brief description of the accompanying drawings used herein is given below. Obviously, the drawings listed below are only examples and a person skilled in the art should be noted that, other drawings can also be obtained on the basis of these exemplary drawings without creative activity.

DETAILED DESCRIPTION

Technical schemes of the present disclosure will be described clearly and completely in conjunction with accompanying drawings. The implementations illustrated below are merely part rather than all of the present disclosure. Any other implementations obtained by one skilled in the art based on the implementations described herein without creative work should fall into the protective scope of the present disclosure.

Terminology used herein is for the purpose of describing particular embodiments only and is not intended to be limiting of the disclosure. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/". Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

The device described herein may include a mobile device or mobile terminal, such as smart phone (for example, Android mobile phone, iOS mobile phone, Windows mobile phone), tablet computer, personal digital assistant (PDA), laptop, mobile Internet device (MID) or wearable device. The above devices are provided for exemplary purposes and should not be interpreted to limit the scope of the device described herein.

Taking a mobile terminal as an example, implementations of the present disclosure will be described in detail. The mobile terminal may include a processor, for example, a central processing unit (CPU), and a display unit. The processor is configured to process images to be displayed on the display unit. The processor is further configured to generate a specific refresh frequency. The display unit is in communication with the processor and configured to display the images processed by the processor at the specific refresh frequency.

Figure 1:
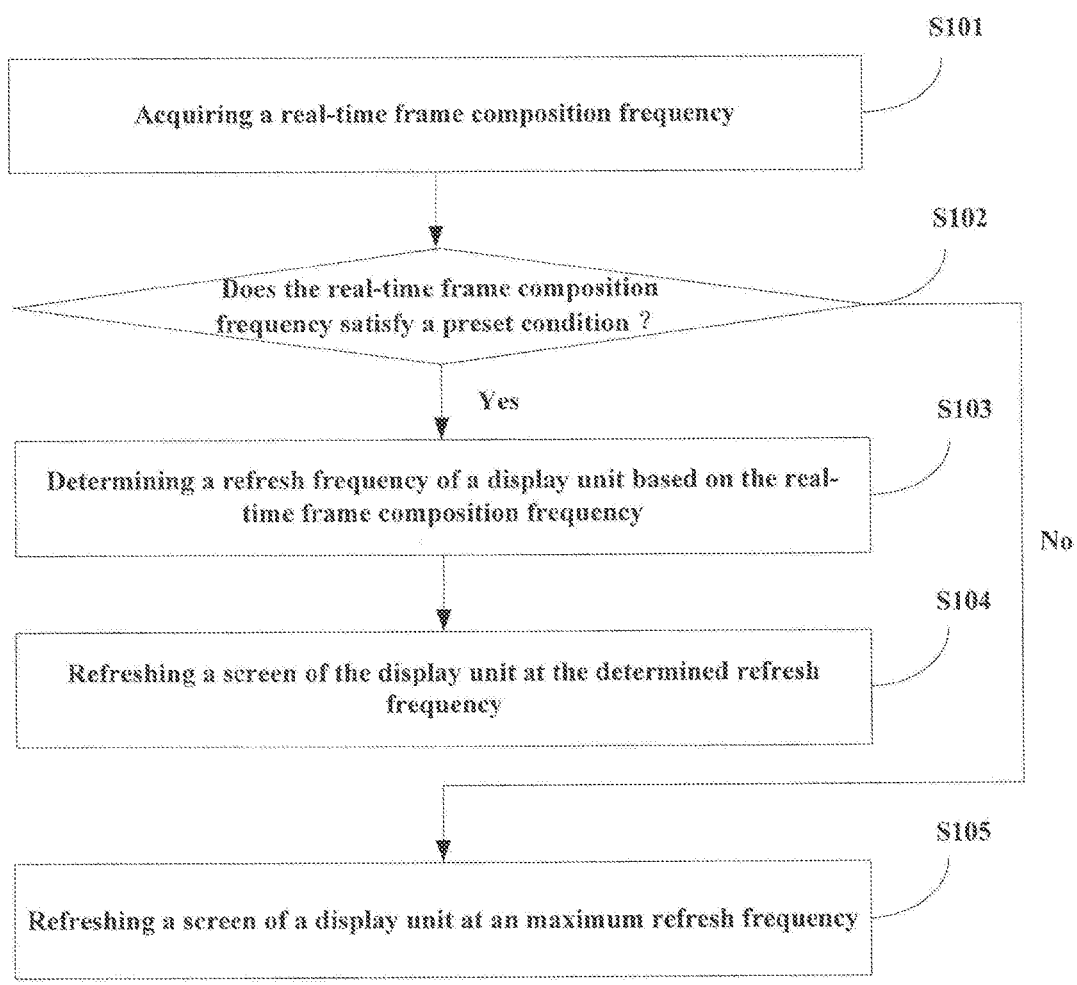
FIG. 1 is a flowchart illustrating a method for control of a refresh frequency of a display unit according to one embodiment of the present disclosure.

As illustrated in FIG. 1, a flowchart illustrating a method for control of a refresh frequency of a display unit is provided. A real-time frame composition frequency corresponding to an amount of time required for the processor to complete composition of an image frame to be displayed may be acquired at S101. Then, at S102, the method can include determining whether the real-time frame composition frequency satisfies a preset condition. If the real-time frame composition frequency does not satisfy the preset condition, the screen of the display unit may be refreshed at a preset maximum frame frequency at S105. If the real-time frame composition frequency satisfies the preset condition, the refresh frequency of the display unit may be determined based on the real-time frame composition frequency at S103, and the screen of the display unit may be refreshed at the determined refresh frequency at S104.

Figure 2:
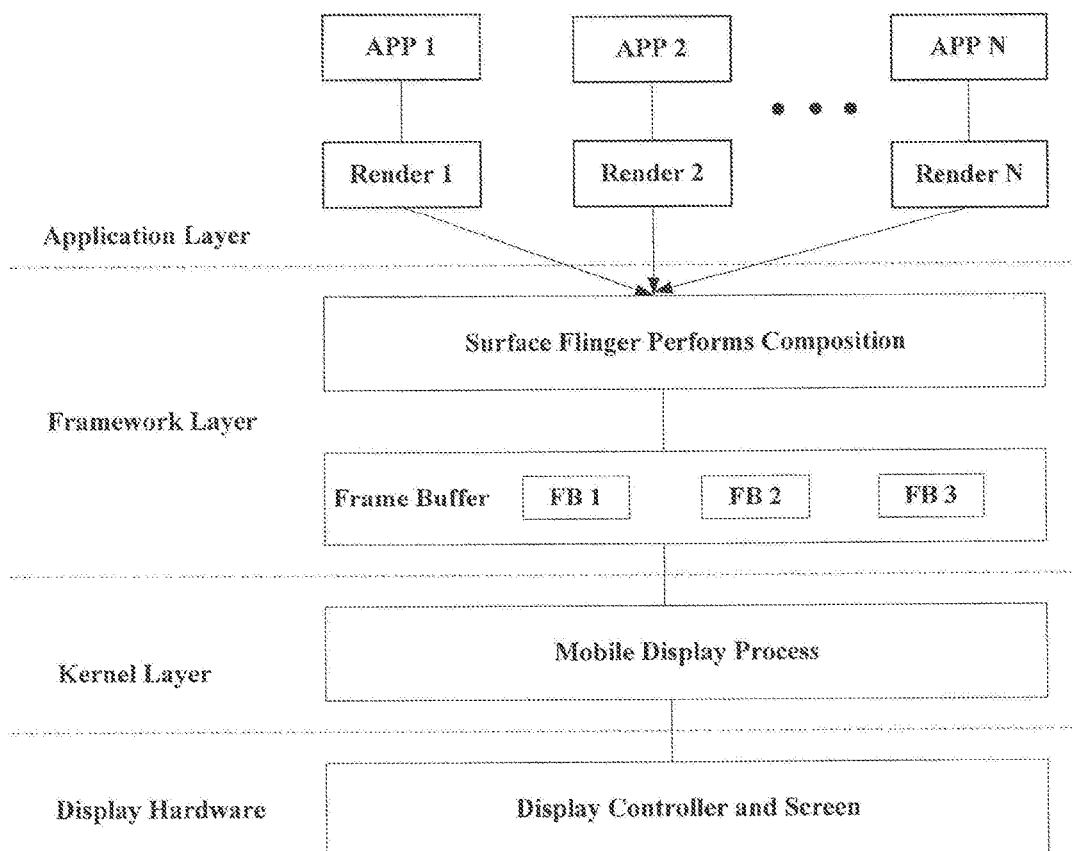
FIG. 2 is a schematic diagram illustrating a display process according to one embodiment of the present disclosure.

The mobile terminal may be an Android mobile phone. In this case, an Android system may run in the mobile terminal. Some processes of display image processing in the Android system will be illustrated below. FIG. 2 is a schematic diagram illustrating a display process according to one embodiment of the present disclosure.

Firstly, in an application layer of the Android system, each application (i.e., application program) may perform an image rendering operation individually according to its own condition (which is generally determined by its corresponding installation package, i.e., Android Package (APK). After the image rendering operation, each application may transmit the rendered image to a surface flinger which performs image composition. The surface flinger may receive more than on rendered images from different applications.

Then, in a framework layer of the Android system, there may be three frame buffers (FBs) in the system, and the three frame buffers may be recycled. The surface flinger may select one free FB from the three FBs, and perform image composition on the free FB to overlay a plurality of rendered images from different applications to obtain an image frame to be display (or an image to be displayed), based on application configuration information, for example, which one of these rendered images should be positioned at the bottom of the overlap, and which one of these rendered images should be positioned at the top of the overlap.

Finally, in a Kernel layer of the Android system, the image frame to be displayed may be transmitted by a mobile display process (MDP) module to a display unit. The display unit may include a display controller and a screen, and the display controller may receive the image frame to be displayed and display the received image frame on the screen. The type of the display unit is not limited here, for example, the display unit may be a liquid crystal display (LCD).

Figure 3:
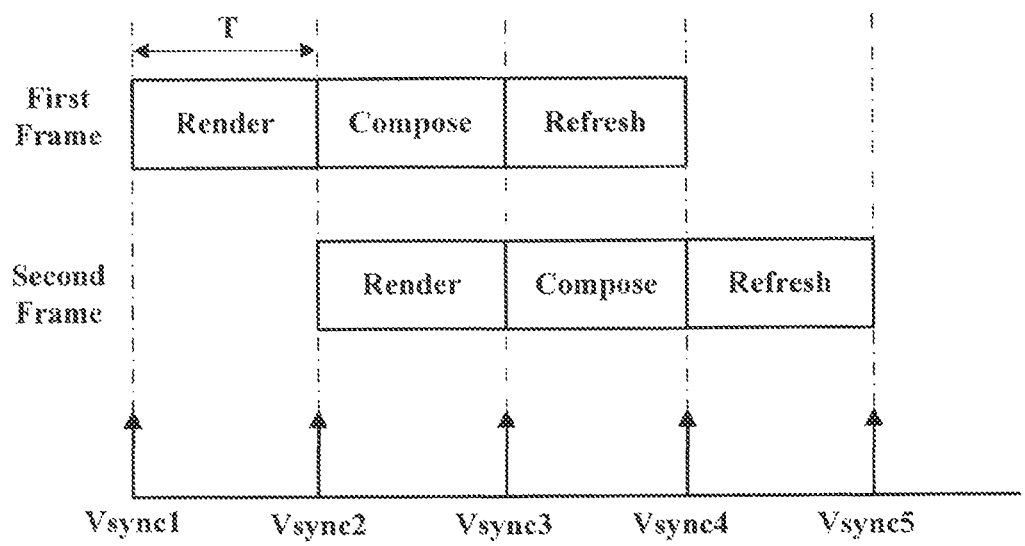
FIG. 3 is a schematic diagram illustrating a Vsync display mechanism according to one embodiment of the present disclosure.

In addition, a vertical synchronization (Vsync) refresh mechanism may be introduced in the Android system for display refresh. FIG. 3 illustrated a Vsync display mechanism used in this embodiment. In particular, the Vsync refresh mechanism is a refresh mechanism in which a "heartbeat" signal, i.e., system Vsync signal, may be inserted during the whole display process, the "heartbeat" signal is transmitted by the display controller of the display unit to the processor, the "heartbeat" signal is used to generate a Vsync interrupt to control each rendering operation and each composition operation. Both the rendering operation and the composition operation should be performed based on the "heartbeat" signal, so that all the critical processes of the display image processing may have been included in a uniform management mechanism based on the Vsync. A common frequency of the Vsync signal is at 60 Hz.

As illustrated in FIG. 3, given that the cycle of the Vsync signal is T and there is no delay in signal transmission, after a first Vsync signal Vsync1 reaches the processor, the processor may transmit the first Vsync signal Vsync1 to a plurality of applications, and each of the plurality of applications may perform a rendering operation in response to a touch or drag manipulation on the screen. After each of the plurality of applications has completed the rendering operation, a plurality of images rendered by the plurality of applications respectively may be obtained. After a second Vsync signal Vsync2 reaches the processor, the processor may transmit the second Vsync signal Vsync2 to the surface flinger. The surface flinger may perform image composition operation to compose the plurality of images rendered by the respective applications into an image frame to be displayed. After a third Vsync signal Vsync3 reaches the processor, the system may perform display refresh, to display the image frame to be displayed on the screen of the display unit.

During the processes of the image rendering, image composition and display refresh performed by the processor, there may be three frame frequencies: rendering, frequency, image composition frequency and refresh frequency.

The rendering frequency is a frequency at which the surface flinger is triggered to perform image composition after the application has completed the image rendering. The rendering frequency may be understood as the number of times per unit of time (for example, 1 second) the application performs the image rendering.

The image composition frequency is a frequency at which the images rendered by the respective application are composed into an image frame to be displayed.

The refresh frequency is a frequency at which the screen of the display unit is refreshed, that is, a screen refresh frequency. The screen may be generally refreshed at a refresh frequency of 60 Hz.

At S101, acquiring the real-time frame composition frequency may include: acquiring N amounts of time required for the processor to complete composition of N image frames to be displayed before current time respectively; and determining the real-time frame composition frequency according to the following formula:

$$S = 1 \bigg/ \sum_{i=1}^{N} (T_i/N),$$

where S is the real-time frame composition frequency, and $T_i$ is an amount of time required for the processor to complete composition of i-th image frame to be displayed.

At S102, the preset condition may be a condition where the real-time frame composition frequency is less than the preset maximum frame frequency. In particular, when the sum of the real-time frame composition frequency and a first preset value is less than the preset maximum frame frequency, it can determine that the real-time frame composition frequency satisfies the preset condition. The first preset value may be 0.

At S103, the refresh frequency of the display unit may be determined based on the real-time frame composition frequency. In this way, the refresh frequency of the display unit can be controlled based on the real-time frame composition frequency. Compared with the prior art which performs refresh at a constant refresh frequency, the screen of the display unit in this embodiment can be refreshed at a more reasonable refresh frequency. In addition, the screen in the prior art is generally refreshed at a constant refresh frequency of 60 Hz, in contrast, the refresh frequency of the display unit can be determined based on the real-time frame composition frequency in this embodiment, so when a real-time frame composition frequency less than 60 Hz is set as the refresh frequency of the display unit, the power consumption of the mobile terminal can be reduced.

The refresh frequency of the display unit may be further determined based on a relationship between the real-time frame composition frequency and a preset minimum refresh frequency and a relationship between the real-time frame composition frequency and a preset maximum refresh frequency. In particular, the refresh frequency of the display unit may be set to be the same as the real-time frame composition frequency. The reason is that when the refresh frequency is in synchronization with the real-time frame composition frequency, all the image frames formed by the surface flinger in a unit time may be displayed on the display unit in the same unit time, that is, the number of times the screen is refreshed in the unit time is the same as the number of the image frames formed in the unit time, to avoid refreshing the screen of the display unit when there is no image to be composed into the image frame to be displayed, to save power. The preset maximum refresh frequency may be the maximum frequency of the screen refresh supported by the mobile terminal. The present minimum refresh frequency may be the minimum frequency of the screen refresh supported by the mobile terminal. If the refresh frequency of the display unit is less than the preset minimum refresh frequency, flicker may occur on the screen of the display unit.

Specifically, when the real-time frame composition frequency is less than the preset minimum refresh frequency, the refresh frequency of the display unit may be set as the preset minimum refresh frequency, and when the real-time frame composition frequency is greater than the preset minimum refresh frequency and less than the preset maximum refresh frequency, the refresh frequency of the display unit may be set as a medium refresh frequency greater than the preset minimum refresh frequency and less than the preset maximum refresh frequency.

At 104, the screen of the display unit may be refreshed at the determined refresh frequency. In particular, after the refresh frequency of the display unit has been determined based on the real-time frame composition frequency, the display unit may display the image frames at the determined refresh frequency, that is, the display unit may refresh the screen at the determined refresh frequency.

At S105, the screen of the display unit may be refreshed at the preset maximum frame frequency. In particular, when the real-time frame composition frequency does not satisfy the preset condition, for example, when the real-time frame composition frequency is greater than the preset maximum frame frequency, or the refresh mode of the display unit has been adjusted to refresh the screen at a constant refresh frequency, the screen of the display unit may be refreshed at the preset maximum frame frequency.

According to the method for control of the refresh frequency of the display unit, when the real-time frame composition frequency is acquired and satisfies the preset condition, the refresh frequency of the display unit can be determined based on the real-time frame composition frequency, and the screen of the display unit can be refreshed at the determined refresh frequency. In such way, the refresh frequency of the display unit can be controlled dynamically and reasonably.

Figure 4:
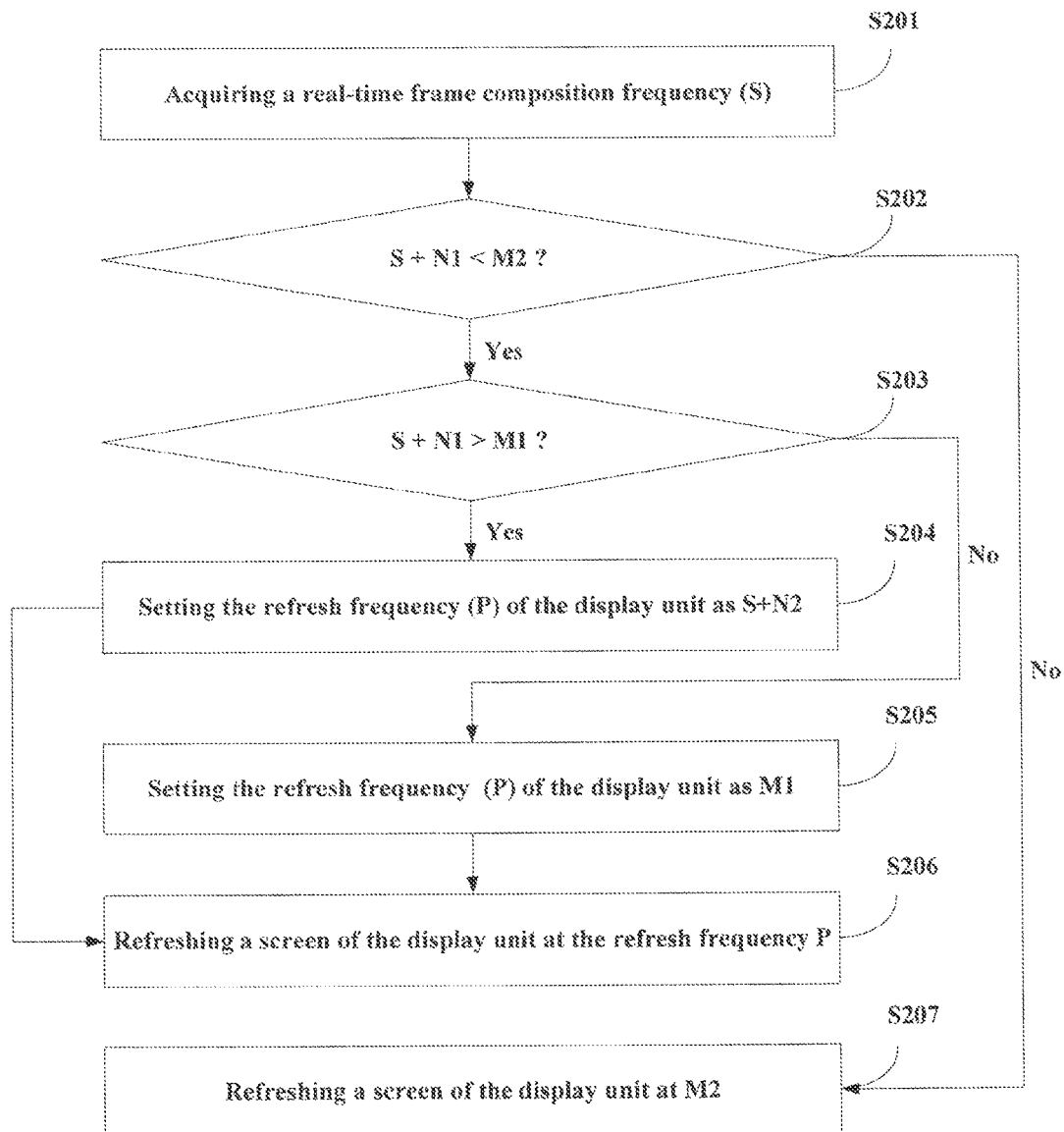
FIG. 4 is a flowchart illustrating a method for control of a refresh frequency of a display unit according to another embodiment of the present disclosure.

FIG. 4 is a flowchart illustrating a method for control of a refresh frequency of a display unit according to another embodiment of the present disclosure. The display unit is in communication with a processor and configured to display image frames processed by the processor. The display unit includes a screen on which the image frames are displayed. A real-time frame composition frequency corresponding to a time required for the processor to complete composition of an image frame to be displayed may be acquired at S201. Then, at S202, it is determined whether a sum of the real-time frame composition frequency S and a first preset value N1 is less than a preset maximum refresh frequency M2. If the sum S+N1 is not less than the preset maximum refresh frequency M2, the screen of the display unit may be refreshed at the preset maximum frame frequency M2 at S207. If the sum S+N1 is less than the preset maximum refresh frequency M2, determine whether the sum S+N1 is greater than or equal to a preset minimum refresh frequency M1 at S203. If the sum S+N1 is greater than or equal to a preset minimum refresh frequency M1, the refresh frequency P of the display unit is set as a sum of the real-time frame composition frequency S and a second preset value N2 at S204, where, the sum S+N2 is less than or equal to M2. If the sum S+N1 is less than the preset minimum refresh frequency M1, the refresh frequency P of the display unit is set as the preset minimum refresh frequency M1 at S205. The screen of the display unit may be refreshed at the refresh frequency P at S206.

Both of the first preset value N1 and the second preset value N2 are greater than or equal to 0 and their practical values can be set according to demands of applications, provided that 0≤S+N1≤M2 and 0≤S+N2≤M2. For example, the first preset value N1 may be set as 0, and the second preset value N2 may be set as 2. The second preset value N2 is provided to ensure the refresh frequency of the display unit is greater than or equal to the real-time frame composition frequency.

In addition, the refresh frequency of the display unit may be set according to the operation of the mobile terminal. For example, when the mobile terminal is in a static scene in which the image displayed on the screen of the display unit will not be updated, the refresh frequency of the display unit may be set as M1. Once the processor detects that the mobile terminal is switched from the static scene to a dynamic scene in which the image displayed on the screen of the display unit will be updated, the refresh frequency of the display unit may be improved to M2 immediately. However, there may be a problem in the above way, that is, during transition from the static scene to the dynamic scene, the frame composition frequency of the image frame to be displayed may not be improved immediately, so the display effect of the display unit may not be improved immediately even if the refresh frequency of the display unit has been improved to M2. Moreover, the refresh frequency of the display unit is set as M2 once the mobile terminal is in the dynamic scene in the above way, without considering the operation of the mobile terminal and the practical applications, which increases the processing load of the display unit. Further, the refresh frequency of the display unit may be kept at M2 when the mobile terminal is in the dynamic scene in the above way, which increases power consumption. For the above method provided in this embodiment, when the sum of the real-time frame composition frequency S and N1 is less than M1, the refresh frequency of the display unit is set as M1, and when the sum of the real-time frame composition frequency S and N1 is greater than or equal to M1, the refresh frequency of the display unit is set as S+N2, so that the refresh frequency of the display unit can be set reasonably based on the real-time frame composition frequency. In addition, during the transition from the static scene to the dynamic scene, the real-time frame composition frequency may become greater at any moment, setting the refresh frequency of the display unit as the sum of the real-time frame composition frequency S and N2 can ensure the refresh frequency of the display unit is always greater than or equal to the real-time frame composition frequency, to prevent the composite image frame from being displayed to refresh the screen.

According to the method for control of the refresh frequency of the display unit, the real-time frame composition frequency can be acquired. In the case the sum of the real-time frame composition frequency and the first preset value is less than the maximum refresh frequency, when the sum of the real-time frame composition frequency and the first preset value is greater than or equal to the minimum refresh frequency, the refresh frequency of the display unit can be set as the sum of the real-time frame composition frequency and the second preset value, otherwise the refresh frequency of the display unit can be set as the minimum refresh frequency. In such way, the refresh frequency of the display unit can be controlled dynamically and reasonably.

Figure 5:
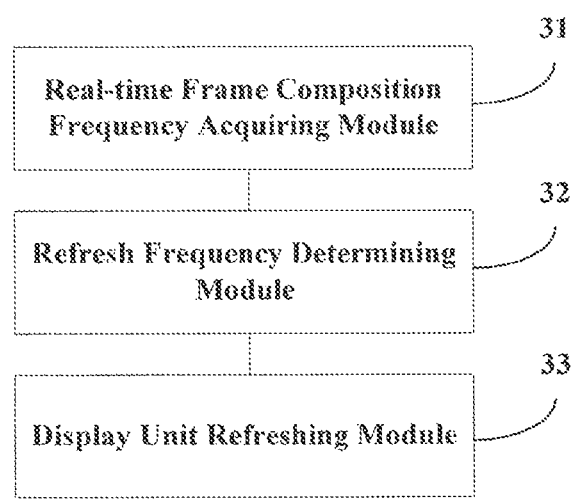
FIG. 5 is a schematic diagram illustrating function modules for control of a refresh frequency of a display unit according to one embodiment of the present disclosure.

FIG. 5 is a schematic diagram illustrating function modules for control of a refresh frequency of a display unit according to one embodiment of the present disclosure. These function modules can be implemented by software and/or hardware which may be integrated into a device. As illustrated in FIG. 5, these function modules include a real-time frame composition frequency acquiring module 31, an refresh frequency determining module 32 and a display unit refreshing module 33.

The real-time frame composition frequency acquiring module 31 is configured to acquire a real-time frame composition frequency corresponding to an amount of time required for the processor to complete composition of an image frame to be displayed. The refresh frequency determining module 32 is configured to determine a refresh frequency of the display unit based on the real-time frame composition frequency, when the real-time frame composition frequency satisfies a preset condition. The display unit refreshing module is configured to refresh a screen of the display unit at the determined refresh frequency.

The refresh frequency determining module may be further configured to determine the refresh frequency of the display unit based on a relationship between the real-time frame composition frequency and a preset minimum refresh frequency and a relationship between the real-time frame composition frequency and a preset maximum refresh frequency, when a sum of the real-time frame composition frequency and a first preset value is less than the preset maximum refresh frequency.

Specifically, the refresh frequency determining module may be further configured to: set the refresh frequency of the display unit as a sum of the real-time frame composition frequency and a second preset value, when the sum of the real-time frame composition frequency and the first preset value is greater than and equal to the preset minimum refresh frequency, wherein the sum of the real-time frame composition frequency and the second preset value is less than the preset maximum refresh frequency: and set the refresh frequency of the display unit as the preset minimum refresh frequency, when the sum of the real-time frame composition frequency and the first preset value is less than the preset minimum refresh frequency.

In this embodiment, the first preset value may be set as 0, and the second preset value may be set as 2.

The real-time frame composition frequency acquiring module may be further configured to:
acquire N amounts of time required for the processor to complete composition of N image frames to be displayed before current time respectively: and determine the real-time frame composition frequency according to the following formula:

$$S = 1 \bigg/ \sum_{i=1}^{N} (T_i/N),$$

where S is the real-time frame composition frequency, and $T_i$ is an amount of time required for the processor to complete composition of i-th image frame to be displayed.

According to the above device, when the real-time frame composition frequency is acquired and satisfies the preset condition, the refresh frequency of the display unit can be determined based on the real-time frame composition frequency, and the screen of the display unit can be refreshed at the determined refresh frequency. In such way, the refresh frequency of the display unit can be controlled dynamically and reasonably.

Figure 6:
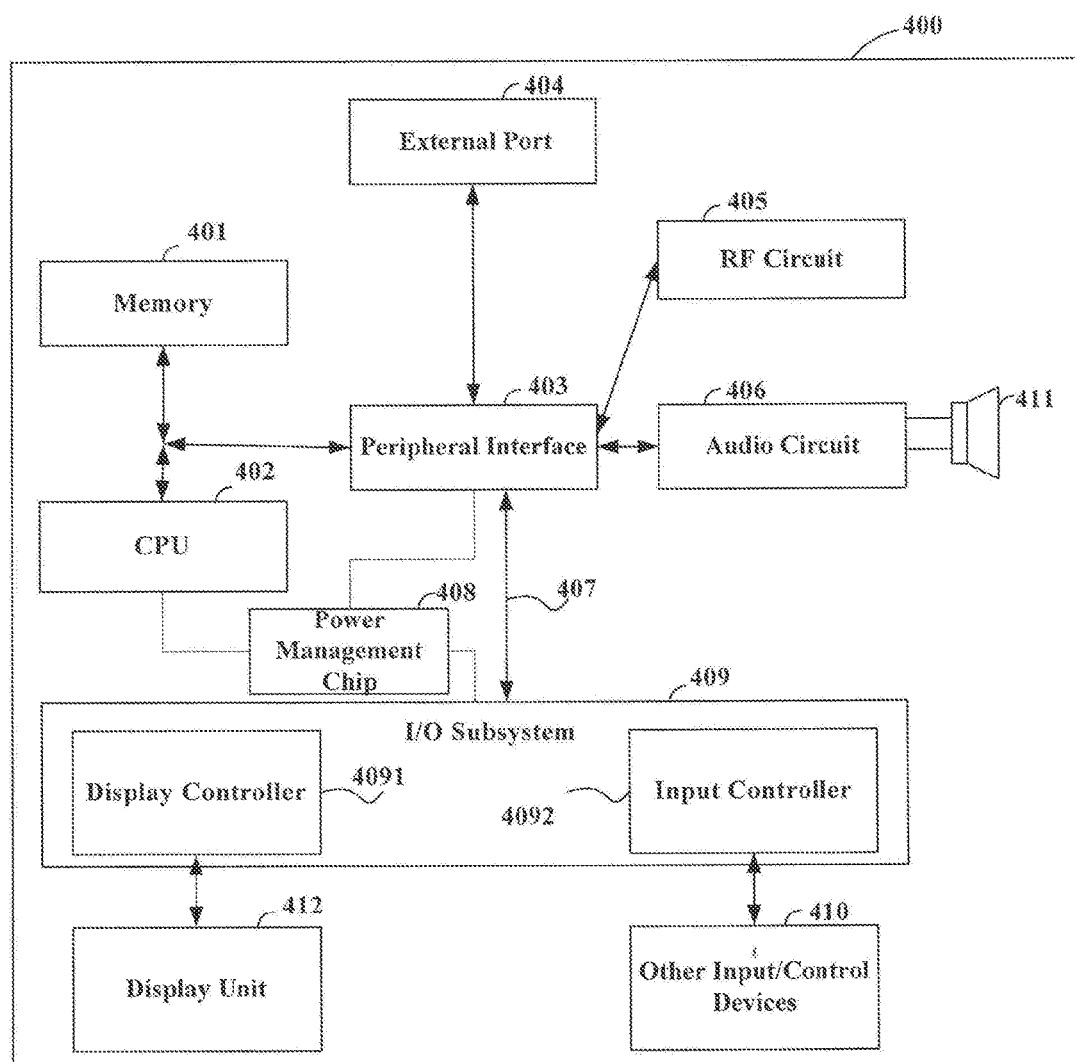
FIG. 6 is a structural schematic diagram illustrating a mobile phone according to one embodiment of the present disclosure.

As discussed, different approaches can be implemented in various devices in accordance with the described embodiments. The device may include mobile phone, tablet computer, personal digital assistant (PDA), point of sales (POS), on-board computer or other computing devices. As will be appreciated, a mobile phone is used for purposes of explanation, different devices may be used, as appropriate, to implement various embodiments. For example, FIG. 6 illustrates an example of a mobile phone for implementing aspects in accordance with various embodiments. As illustrated in FIG. 6, the mobile phone may include a memory 401, and a processor 402, for example, central processing unit (CPU). The memory 401 may be configured to store executable programs. The processor 402 is configured to execute various applications and data processing of the mobile phone by running the executable programs stored in the memory 401, In particular, the processor may be caused to execute a method for control of a refresh frequency of a display unit as described above. The memory 401 may include a program storage area and a data storage area. The program storage area may be configured to store an operating system, and application programs required by at least one functions (for example, a voice broadcast function and an image display function), etc. The data storage area may be configured to store data (for example, audio data and contacts) created according to the use of the mobile phone, etc. In addition, the memory 401 may include a high speed random access memory, and can also include a non-transitory memory, for example, at least one magnetic disk memory, flash memory, or any other transitory solid-state memory.

As illustrated in FIG. 6, the mobile phone may further include a peripheral interface 403, a radio frequency (RF) circuit 405, an audio circuit 406, a loudspeaker 411, a power management chip 408, an input/output (I/O) subsystem 409, a display unit 412, other input/control devices 410 and an external port 404. These components are communicated through one or more communication buses or signal lines 407. It is understood by those skilled in the art that the configuration of the mobile phone as illustrated in FIG. 6 should not be interpreted to limit the mobile phone, more or less components may be included, some components may be combined, and a different arrangement of the components may be used.

The above components of the mobile phone will be detailed in the following description taken in conjunction with FIG. 6.

The peripheral interface 403 may be configured to couple a peripheral device.

The I/O subsystem 409 may be configured to couple an I/O peripheral, such as the display unit 412 and the other input/control devices 410 to the peripheral interface 403. The I/O subsystem 409 may include a display controller 4091, and one or more input controllers 4092 for controlling the other input/control devices 410. The one or more input controllers 4092 may receive electrical signals from the other input/control devices 410, or transmit electrical signals to the other input/control devices 410. The other input/control devices 410 may include a physical button (such as push button, and rocker arm button), a dial, a slide switch, a joystick and a scroll wheel. It should be noted that the input controller 4092 may be coupled to any of a keyboard, an infrared port, a USB interface, and an indicating device such as mouse.

The display unit 412 may be used as the display unit in the above embodiments. The display unit 412 unit may include a screen which may be in a form of LCD (Liquid Crystal Display) or OLED (Organic Light-Emitting Diode). The screen may also be a touch screen to accept touch input from the user.

The RF circuit 405 may be configured to receive and transmit data in the process of sending and receiving messages or in the communication process, particularly, receive the downlink messages from the base station and send it to the processor for processing, and moreover send uplink data of the mobile phone to the base station. The RF circuit 405 generally includes, but is not limited to an antenna, at least one amplifier, a transceiver, a coupler, a low noise amplifier (LNA), and a duplexer. In addition, the RF circuit 405 may communicate with the Internet or other devices via wireless communication. The above wireless communication may adopt any communication standard or protocol, including but not limited to GSM (Global System for Mobile communication), GPRS (General Packet Radio Service), CDMA (Code Division Multiple Access), WCDMA (Wideband Code Division Multiple Access), LTE (Long Term Evolution), E-mail and SMS (Short Messaging Service).

The audio circuit 406 may be configured to receive audio data from the peripheral interface 403, convert the audio data to electrical signals, and transmit electrical signals to the loudspeaker.

The loudspeaker 411 may configured to receive the electrical signals from the audio circuit 406, convert the electric signals to sound signals, and play the sound signals.

The power management chip 408 may be configured to supply power to the processor 402, I/O subsystem 409 and hardware coupled to the peripheral interface 403, and manage the power supply.

The above mobile phone can implement the methods provided in the above embodiments, with function modules to perform corresponding functions. When the real-time frame composition frequency is acquired and satisfies the preset condition, the refresh frequency of the display unit can be determined based on the real-time frame composition frequency, and the screen of the display unit can be refreshed at the determined refresh frequency. The refresh frequency of the display unit can thus be controlled dynamically and reasonably.

Also described herein is a computer-readable storage medium. The computer-readable storage medium is configured to store computer executable instructions when executed on a computing device, adapted to perform the methods for control of a refresh frequency of a display unit as described in the above embodiments.

The computer-readable storage medium includes computer storage medium and communication medium, among which the communication medium includes any medium used to transmit computer program from one direction to another place. The storage medium can be any available medium that is accessible to the computer. The computer-readable storage medium includes but not limited to read only memory (ROM), random access memory (RAM), electrically erasable programmable read-only memory (EE- PROM), compact disc read-only memory (CD-ROM) or other CD storage medium, disk storage medium, magnetic storage devices, or any other medium which can be used to carry or store program code in a desired structural form of instruction or data and is accessible to a computer.

In addition, the computer-readable medium includes any form of connection. For example, if software is transmitted from websites, servers, or other remote sources through coaxial cable, optical fiber cable, twisted-pair wires, digital subscriber line (DSL), or wireless technologies such as Infrared, wireless, microwave and so on, then coaxial cable, optical fiber cable, twisted-pair wires, DSL, or wireless technologies such as Infrared, wireless, microwave should be included in the definition of storage medium. As used herein, disk or disc includes CD, laser disc, DVD, Floppy disk and Blue-ray Disc, usually, disk copies data via magnetic, while disc copies data by laser optically. Combinations of the mediums described above fall into the protective scope of the computer-readable medium of the present disclosure either.

Although various illustrative embodiments are described above, any of a number of changes may be made to various embodiments without departing from the scope of the invention as described by the claims. For example, the sequence in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

Those skilled in the art should be appreciated that the present disclosure can be implemented through hardware, firmware, or a combination thereof. When implemented via software, the above mentioned functions can be stored in a computer-readable medium or can be transmitted as one or more instruction or code on the computer-readable storage medium. Additionally, in the implementations of the present disclosure, each functional unit can be integrated in one processing unit or can be separated physically, or two or more units can be integrated into one unit. The integrated units described above can be implemented in the form of hardware or software.

Although various illustrative embodiments are described above, any of a number of changes may be made to various embodiments without departing from the scope of the invention as described by the claims. For example, the sequence in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method for control of a refresh frequency of a display unit, the display unit being in communication with a processor and configured to display image frames processed by the processor on a screen of the display unit, the method comprising:

acquiring a frame composition frequency of image frames, wherein each of the image frames is composed from images rendered by various applications;

determining a refresh frequency of the display unit based on the frame composition frequency, when the frame composition frequency is less than a preset maximum refresh frequency of the display unit; and refreshing the screen of the display unit at the determined refresh frequency;

wherein acquiring the frame composition frequency of image frames comprises:

acquiring time taken by the processor to complete composition of each of N successive image frames displayed immediately before performing the acquiring operation; and determining the frame composition frequency of the image frames according to the following formula:

$$S = 1 \bigg/ \sum_{i=1}^{N} (T_i/N),$$

where S is the frame composition frequency of the image frames, and $T_i$ is time taken by the processor to complete composition of an i-th image frame among the N successive image frames displayed immediately before performing the acquiring operation.

2. The method of claim 1, further comprising:
   refreshing the screen of the display unit at the preset maximum refresh frequency, when the frame composition frequency is no less than the preset maximum refresh frequency of the display unit.

3. The method of claim 1, wherein determining the refresh frequency of the display unit based on the frame composition frequency comprises:
   determining the refresh frequency of the display unit based on a relationship between the frame composition frequency and a preset minimum refresh frequency and a relationship between the frame composition frequency and the preset maximum refresh frequency, when a sum of the frame composition frequency and a first preset value is less than the preset maximum refresh frequency.

4. The method of claim 3, wherein determining the refresh frequency of the display unit based on the relationship between the frame composition frequency and the preset minimum refresh frequency and the relationship between the frame composition frequency and the preset maximum refresh frequency comprises:

setting the refresh frequency of the display unit as a sum of the frame composition frequency and a second preset value, when the sum of the frame composition frequency and the first preset value is greater than or equal to the preset minimum refresh frequency, wherein the sum of the frame composition frequency and the second preset value is less than the preset maximum refresh frequency; and setting the refresh frequency of the display unit as the preset minimum refresh frequency, when the sum of the frame composition frequency and the first preset value is less than the preset minimum refresh frequency.

5. The method of claim 4, wherein the first preset value is set as 0, and the second preset value is set as 2.

6. The method of claim 1, further comprising:

in response to a system vertical synchronization signal transmitted by a display controller of the display unit, generating a interrupt to control rendering and composition operations of each image frame according to the system vertical synchronization signal.

7. The method of claim 6, further comprising:

in response to a first system vertical synchronization signal transmitted by the display controller of the display unit, forwarding the first system vertical synchronization signal to a plurality of applications, wherein the first system vertical synchronization signal indicates each application to perform a rendering operation in response to a touch or drag manipulation on the screen, so as to obtain a plurality of images rendered by the plurality of applications respectively;

in response to a second system vertical synchronization signal transmitted by the display controller of the display unit, forwarding the second system vertical synchronization signal to a surface flinger, wherein the second system vertical synchronization signal indicates the surface flinger to perform image composition operation of the plurality of images rendered by the plurality of applications respectively, so as to obtain the image frames to be displayed; and in response to a third system vertical synchronization signal transmitted by the display controller of the display unit, performing refreshing operation to display the image frames to be displayed on the screen of the display unit.

8. The method of claim 1, a running scene of a mobile terminal includes a static scene, a dynamic scene and a transition scene, each of the static scene, the dynamic scene and the transition scene corresponds to a refresh frequency of the display unit, wherein determining the refresh frequency of the display unit based on the frame composition frequency comprises:

during transition from the static scene to the dynamic scene through the transition scene, setting the refresh frequency of the display unit as a sum of the frame composition frequency and a second preset value, when the sum of the frame composition frequency and a first preset value is greater than or equal to a preset minimum refresh frequency, wherein the first preset value is smaller than the second preset value.

9. A device is provided, comprising:
a processor;
a memory; and
one or more programs, wherein the one or more programs are stored in the memory and configured to be executed by the processor, the one or more programs including:
a real-time frame composition frequency acquiring module, configured to acquire a frame composition frequency of image frames, wherein each of the image frames is composed from images rendered by various applications;
a refresh frequency determining module, configured to determine a refresh frequency of the display unit based on the frame composition frequency, when the frame composition frequency is less than a preset maximum refresh frequency; and
a display unit refreshing module, configured to refresh a screen of the display unit at the determined refresh frequency;
wherein the real-time frame composition frequency acquiring module is further configured to:
acquire time taken by the processor to complete composition of each of N successive image frames displayed immediately before performing the acquiring operation; and determine the frame composition frequency of the image frames according to the following formula:

$$S = 1 \bigg/ \sum_{i=1}^{N} (T_i/N),$$

where S is the frame composition frequency of the image frames, and $T_i$ is time taken by the processor to complete composition of an i-th image frame among the N successive image frames displayed immediately before performing the acquiring operation.

10. The device of claim 9, wherein the refresh frequency determining module is further configured to refresh the screen of the display unit at the preset maximum refresh frequency, when the frame composition frequency is no less than the preset maximum refresh frequency.

11. The device of claim 9, wherein the refresh frequency determining module is further configured to determine the refresh frequency of the display unit based on a relationship between the frame composition frequency and a preset minimum refresh frequency and a relationship between the frame composition frequency and a preset maximum refresh frequency, when a sum of the frame composition frequency and a first preset value is less than the preset maximum refresh frequency.

12. The device of claim 11, wherein the refresh frequency determining module is further configured to:

set the refresh frequency of the display unit as a sum of the frame composition frequency and a second preset value, when the sum of the frame composition frequency and the first preset value is greater than and or equal to the preset minimum refresh frequency, wherein the sum of the frame composition frequency and the second preset value is less than the preset maximum refresh frequency; and set the refresh frequency of the display unit as the preset minimum refresh frequency, when the sum of the frame composition frequency and the first preset value is less than the preset minimum refresh frequency.

13. The device of claim 12, wherein the first preset value is set as 0, and the second preset value is set as 2.

14. A non-transitory computer-readable storage medium for storing computer executable instructions, the computer executable instructions being used to control a processor to execute a method for control of a refresh frequency of a display unit, the display unit being in communication with the processor and configured to display image frames processed by the processor on a screen of the display unit, the method comprising:

acquiring a frame composition frequency of image frames, wherein each of the image frames is composed from images rendered by various applications;

determining a refresh frequency of the display unit based on the frame composition frequency, when the the frame composition frequency is less than a preset maximum refresh frequency; and refreshing a screen of the display unit at the determined refresh frequency wherein acquiring the frame composition frequency of image frames comprises:

acquiring time taken by the processor to complete composition of each of N successive image frames displayed immediately before performing the acquiring operation; and determining the frame composition frequency of the image frames according to the following formula:

$$S = 1 \bigg/ \sum_{i=1}^{N} (T_i/N),$$

where S is the frame composition frequency of the image frames, and $T_i$ is time taken by the processor to complete composition of an i-th image frame among the N successive image frames displayed immediately before performing the acquiring operation.

15. The non-transitory computer-readable storage medium of claim 14, wherein the method further comprises:

refreshing the screen of the display unit at the preset maximum refresh frequency, when the frame composition frequency is no less than the preset maximum refresh frequency.

16. The non-transitory computer-readable storage medium of claim 14, wherein determining the refresh frequency of the display unit based on the frame composition frequency comprises:

determining the refresh frequency of the display unit based on a relationship between the frame composition frequency and a preset minimum refresh frequency and a relationship between the frame composition frequency and the preset maximum refresh frequency, when a sum of the frame composition frequency and a first preset value is less than the preset maximum refresh frequency.

17. The non-transitory computer-readable storage medium of claim 16, wherein determining the refresh frequency of the display unit based on the relationship between the frame composition frequency and the preset minimum refresh frequency and the relationship between the frame composition frequency and the preset maximum refresh frequency comprises:

setting the refresh frequency of the display unit as a sum of the frame composition frequency and a second preset value, when the sum of the frame composition frequency and the first preset value is greater than and or equal to the preset minimum refresh frequency, wherein the sum of the frame composition frequency and the second preset value is less than the preset maximum refresh frequency; and setting the refresh frequency of the display unit as the preset minimum refresh frequency, when the sum of the frame composition frequency and the first preset value is less than the preset minimum refresh frequency.

* * * * *